(12) United States Patent
Martin et al.

(10) Patent No.: US 10,711,752 B2
(45) Date of Patent: Jul. 14, 2020

(54) FUEL INJECTOR ASSEMBLY HAVING DUCT STRUCTURE

(71) Applicant: Caterpillar Inc., Peoria, IL (US)

(72) Inventors: Glen Clifford Martin, Peoria, IL (US); Chad Palmer Koci, Washington, IL (US); Kenth I Svensson, Peoria, IL (US); Yongli Qi, Peoria, IL (US); Eric Donald Wiebrecht, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 29 days.

(21) Appl. No.: 15/692,408

(22) Filed: Aug. 31, 2017

(65) Prior Publication Data

US 2019/0063391 A1    Feb. 28, 2019

(51) Int. Cl.
| | |
|---|---|
| *F02M 61/16* | (2006.01) |
| *F02M 61/14* | (2006.01) |
| *F02M 61/18* | (2006.01) |
| *F02F 1/40* | (2006.01) |
| *F02B 23/00* | (2006.01) |
| *F02B 23/06* | (2006.01) |
| *F02F 1/24* | (2006.01) |
| *F02F 3/00* | (2006.01) |

(Continued)

(52) U.S. Cl.
CPC ........... *F02M 61/168* (2013.01); *F02B 23/00* (2013.01); *F02B 23/0651* (2013.01); *F02B 23/0669* (2013.01); *F02F 1/40* (2013.01); *F02M 61/14* (2013.01); *F02M 61/1806* (2013.01); *F01P 3/16* (2013.01); *F02F 1/242* (2013.01); *F02F 3/00* (2013.01); *F02F 7/0002* (2013.01); *F02M 53/043* (2013.01); *F02M 2200/8084* (2013.01); *F02M 2200/852* (2013.01); *F02M 2200/855* (2013.01)

(58) Field of Classification Search
CPC .. F02M 61/168; F02M 61/1806; F02M 61/14; F02M 2200/8084; F02M 2200/855; F02F 1/242; F02F 1/40; F02F 3/00; F02F 7/0002
See application file for complete search history.

(56) References Cited

U.S. PATENT DOCUMENTS

| | | | | | |
|---|---|---|---|---|---|
| 1,260,408 | A | * | 3/1918 | Leissner | F02B 3/06 123/251 |
| 2,223,590 | A | * | 12/1940 | Alden | F02M 41/00 137/625.11 |

(Continued)

FOREIGN PATENT DOCUMENTS

WO    2016054436    4/2016

*Primary Examiner* — Carl C Staubach
(74) *Attorney, Agent, or Firm* — Bookoff McAndrews

(57) ABSTRACT

A fuel injector assembly for an engine. The engine includes a cylinder head defining a through-hole. The fuel injector assembly includes an insert, having a first end and a second end, configured to be received within the through-hole and coupled to the cylinder head. The insert defines a bore extending from the first end to the second end. The fuel injector assembly further includes a fuel injector including a plurality of orifices, received within the bore of the insert; and a duct structure including a plurality of ducts, coupled to the insert such that the plurality of ducts align with the plurality of orifices to at least partially receive one or more fuel jets from the plurality of orifices of the fuel injector.

20 Claims, 14 Drawing Sheets

(51) Int. Cl.
    *F02F 7/00*     (2006.01)
    *F02M 53/04*    (2006.01)
    *F01P 3/16*     (2006.01)

(56) References Cited

U.S. PATENT DOCUMENTS

| | | | |
|---|---|---|---|
| 3,599,612 A * | 8/1971 | Villella | F02B 57/08 |
| | | | 123/44 D |
| 5,224,458 A | 7/1993 | Okada et al. | |
| 5,345,913 A * | 9/1994 | Belshaw | F02M 57/02 |
| | | | 123/470 |
| 5,630,400 A * | 5/1997 | Sumida | F02M 51/0678 |
| | | | 123/470 |
| 6,112,722 A | 9/2000 | Barnhart et al. | |
| 6,824,082 B2 | 11/2004 | Ricco et al. | |
| 7,293,550 B2 | 11/2007 | Beardmore | |
| 7,484,499 B2 * | 2/2009 | Beardmore | F02M 61/14 |
| | | | 123/470 |
| 9,506,439 B2 * | 11/2016 | Anders | F02B 23/00 |
| 9,587,606 B2 * | 3/2017 | Anders | F02M 55/00 |
| 9,797,351 B2 * | 10/2017 | Svensson | F02M 31/20 |
| 9,909,549 B2 * | 3/2018 | Mueller | F02M 61/14 |
| 9,915,190 B2 * | 3/2018 | Koci | F02B 23/10 |
| 10,012,196 B1 * | 7/2018 | Qi | F02M 61/14 |
| 10,036,356 B2 * | 7/2018 | Svensson | F02B 23/0618 |
| 2009/0255998 A1 * | 10/2009 | Das | F02M 61/162 |
| | | | 239/5 |
| 2011/0083638 A1 * | 4/2011 | Stovell | F02B 23/0651 |
| | | | 123/307 |
| 2014/0075949 A1 * | 3/2014 | Prociw | F23R 3/346 |
| | | | 60/740 |
| 2016/0097360 A1 * | 4/2016 | Mueller | F02M 61/14 |
| | | | 123/294 |
| 2016/0169086 A1 * | 6/2016 | Svensson | F02B 23/02 |
| | | | 123/294 |
| 2016/0298528 A1 * | 10/2016 | Svensson | F02B 23/0669 |
| 2017/0009712 A1 | 1/2017 | Svensson et al. | |
| 2017/0159603 A1 * | 6/2017 | Di Pietro | F02F 1/242 |
| 2017/0241368 A1 * | 8/2017 | Anders | F02D 41/403 |
| 2018/0258836 A1 * | 9/2018 | Anders | F02B 23/0651 |

\* cited by examiner

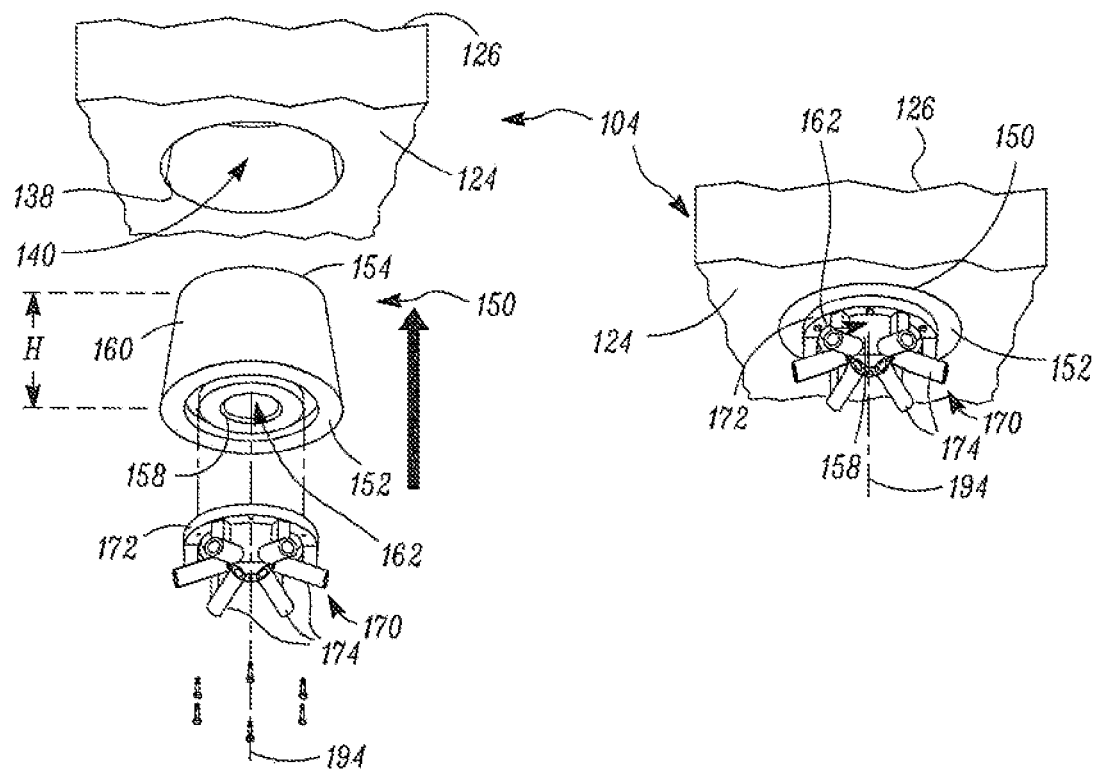
FIG. 8A                    FIG. 8B
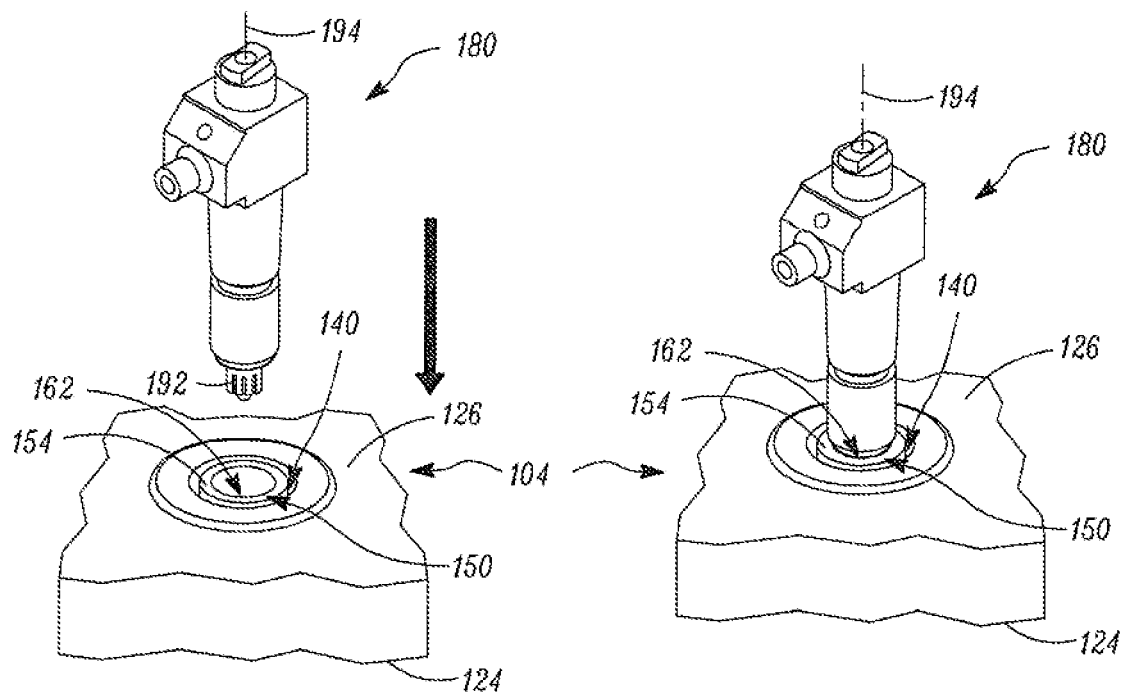
FIG. 8C                    FIG. 8D

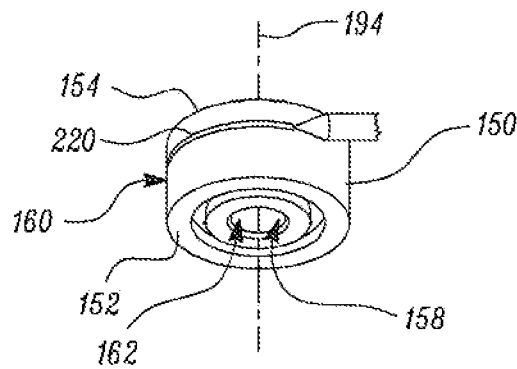 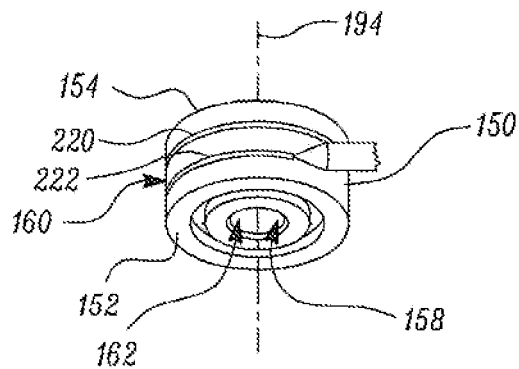
*FIG. 11A*      *FIG. 11B*
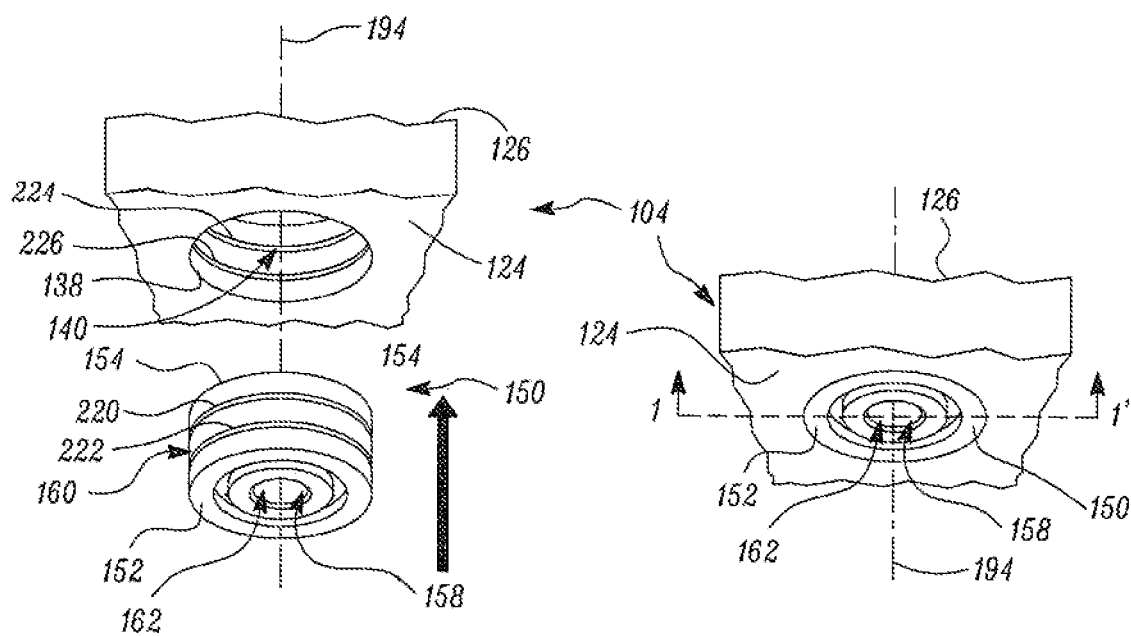
*FIG. 11C*      *FIG. 11D*

FUEL INJECTOR ASSEMBLY HAVING DUCT STRUCTURE

TECHNICAL FIELD

The present disclosure generally relates to an internal combustion engine. More particularly, the present disclosure relates to a fuel injector assembly having a duct structure for the internal combustion engine.

BACKGROUND

Modern combustion engines may include one or more cylinders as part of the engine. The cylinder head and an associated piston may define a combustion chamber therebetween. Fuel for combustion is directly injected into the combustion chamber by, for example, a fuel injector which is associated with the cylinder, the fuel injector having at least one orifice disposed such that it can directly inject fuel into the combustion chamber.

Different mixtures and/or equivalence ratios of the fuel/air mixture may produce different results during combustion. A manner in which the injected fuel mixes and/or interacts with air and other environmental elements of the combustion chamber may impact the combustion process and associated emissions. Further, if the fuel and air mixing is inadequate, a larger amount of soot may form within the combustion chamber.

Ducted assemblies may be implemented in combustion engines to enhance mixing and reduce the amount of soot formed within the combustion chamber. The ducted assemblies include one or more tubular structures known as ducts coupled to the cylinder head. The ducts are positioned relative to the fuel injector such that the ducts receive fuel jets from the at least one orifice of the fuel injector. The fuel jets interact with the ducts to enhance mixing, thereby reducing the amount of soot formed. The orientation of the fuel jets relative to the ducts plays a vital role in achieving optimal operation of the ducted assemblies.

During operation of the engine, the fuel injector and/or the ducts may wear and may eventually fail. Replacing or repairing the fuel injector in such configurations may include de-coupling of the cylinder head from the cylinder block, manually aligning the ducts relative to the orifice of new/repaired fuel injector and re-coupling the cylinder head. Similarly, replacing or repairing the ducts may include de-coupling of the cylinder head from the cylinder block, manually aligning new/repaired ducts relative to the orifice of fuel injector and re-coupling the cylinder head. Such replacement/repairing processes may include cumbersome operations that require skilled labor, which may increase the cost of operation. Further, the removal of the cylinder head and alignment of the ducts relative to the fuel injector is a laborious and a time-consuming task. This may lead to considerable machine downtime which is undesirable.

U.S. Pat. No. 6,824,082 (hereinafter referred to as U.S. Pat. No. 6,824,082) relates to a fuel injector. U.S. Pat. No. 6,824,082 discloses the fuel injector having a tubular injector body. Within the tubular body of the injector includes a seat (i.e. a bore) that houses a tubular valve body (i.e. check). The injector meters fuel into the engine cylinder. The injector body seals within the head to complete the combustion cylinder.

SUMMARY OF THE INVENTION

In an aspect of the present disclosure, a fuel injector assembly for an engine is disclosed. The engine includes a cylinder head defining a through-hole. The fuel injector assembly includes an insert, having a first end and a second end, configured to be received within the through-hole and coupled to the cylinder head. The insert defines a bore extending from the first end to the second end. The fuel injector assembly further includes a fuel injector including a plurality of orifices, received within the bore of the insert; and a duct structure including a plurality of ducts, coupled to the insert such that the plurality of ducts align with the plurality of orifices to at least partially receive one or more fuel jets from the plurality of orifices of the fuel injector.

In another aspect of the present disclosure, an engine is disclosed. The engine includes a piston and a cylinder block defining a piston bore. The piston bore is configured to receive the piston. The engine also includes a cylinder head coupled to the cylinder block. The cylinder head defines a through-hole. The engine further includes a combustion chamber defined by the piston, the cylinder block and the cylinder head and a fuel injector assembly received within the through-hole of the cylinder head. The fuel injector assembly includes an insert received within the through-hole and coupled to the cylinder head. The insert defines a bore. The fuel injector assembly also includes a duct structure, including a plurality of ducts, coupled to the insert such that the plurality of ducts extends into the combustion chamber and a fuel injector, including a plurality of orifices, received within the bore such that the plurality of orifices align with the plurality of ducts to inject one or more fuel jets at least partially into the plurality of ducts.

In yet another aspect of the present disclosure, a method for installing a duct structure and fuel injector in an engine is disclosed. The engine includes a cylinder block, a cylinder head and a piston defining a combustion chamber. The method includes coupling the duct structure, including a plurality of ducts, with an insert, placing the insert within a through-hole of the cylinder head such that the duct structure extends into the combustion chamber and receiving a fuel injector including a plurality of orifices, within a bore defined by the insert such that the plurality of orifices align with the plurality of ducts to inject one or more fuel jets at least partially into the plurality of ducts.

BRIEF DESCRIPTION OF THE DRAWINGS

FIG. 8A illustrates a first stage of assembling the fuel injector assembly, in accordance with an alternate embodiment of the present disclosure;

FIG. 8B illustrates a second stage of assembling the fuel injector assembly, in accordance with an alternate embodiment of the present disclosure;

FIG. 8C illustrates a third stage of assembling the fuel injector assembly, in accordance with an alternate embodiment of the present disclosure;

FIG. 8D illustrates a fourth stage of assembling the fuel injector assembly, in accordance with an alternate embodiment of the present disclosure;

FIG. 11A illustrates a first stage of assembling the fuel injector assembly, in accordance with another embodiment of the present disclosure;

FIG. 11B illustrates a second stage of assembling the fuel injector assembly, in accordance with another embodiment of the present disclosure;

FIG. 11C illustrates a third stage of assembling the fuel injector assembly, in accordance with another embodiment of the present disclosure;

FIG. 11D illustrates a fourth stage of assembling the fuel injector assembly, in accordance with another embodiment of the present disclosure;

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts.

Figure 1:
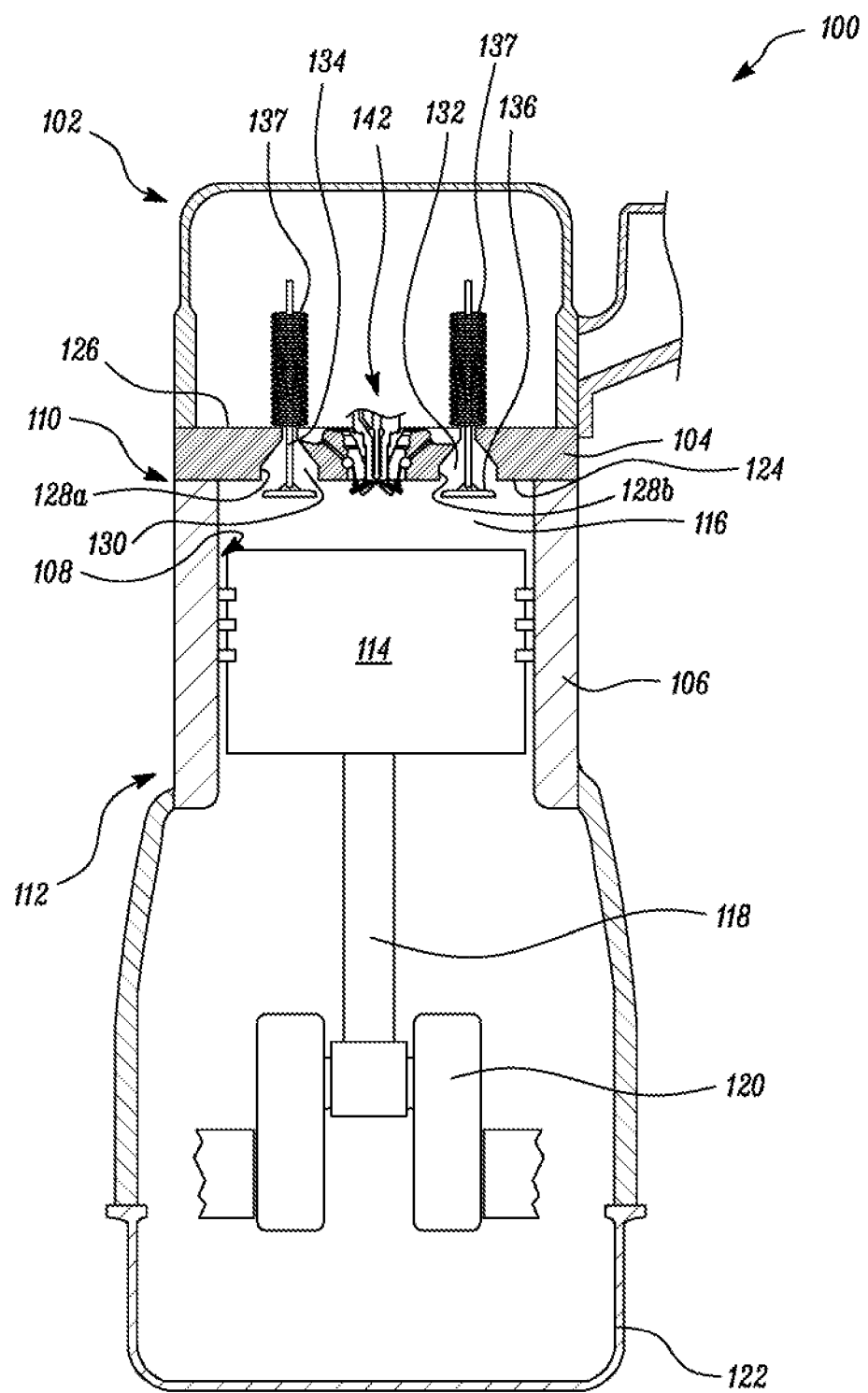
FIG. 1 illustrates a cross sectional view of an exemplary engine, in accordance with an embodiment of the present disclosure.

FIG. 1 illustrates an exemplary engine 100. The engine 100 may be any engine running on solid, liquid or gaseous fuel, used for various purposes such as, but not limited to, production of power for a marine vessel, an automobile, a construction machine, any transportation vehicle, and the like. For example, the engine 100 may be an internal combustion engine running on a hydrocarbon fuel.

The engine 100 may include an outer cover 102. The outer cover 102 is configured to shroud the engine 100 and various engine components of the engine 100 (as described below).

The engine 100 further includes a cylinder head 104 and a cylinder block 106. The cylinder block 106 defines a piston bore 108 extending from a first end 110 of the cylinder block 106 to a second end 112 of the cylinder block 106. The piston bore 108 may be configured to receive a piston 114. The cylinder head 104, the piston bore 108 in the cylinder block 106 and the piston 114 define a combustion chamber 116. The combustion chamber 116 may be defined as a variable volume enclosure defined by the cylinder head 104, the piston bore 108 in the cylinder block 106 and the piston 114.

The combustion chamber 116 is configured to receive an intake charge i.e. one or more of air, fuel, EGR, etc. The piston 114 is configured to reciprocate within the piston bore 108 between a top dead center (the uppermost position in the piston bore 108 of piston 114) and a bottom dead center (the lowermost position of piston 114), during engine operation. The piston 114 may be pivotably coupled to connecting rod 118. The piston 114 slides or reciprocates within the piston bore 108 between the top dead center and the bottom dead center. This reciprocating movement of the piston 114 causes a crankshaft 120, assembled within a crankcase 122, to rotate and produce mechanical work.

The piston 114 may include a piston head that may receive and/or may be exposed to combustion gases (i.e. the gases generated on burning of charge) generated within the combustion chamber 116. The combustion gases may move the piston 114 and transmit a driving force generated by the combustion event to the crankshaft 120. In the embodiment illustrated in FIG. 1 only one piston bore 108 and one piston 114 have been illustrated. Accordingly, only one combustion chamber 116 is illustrated in FIG. 1. However, it may be contemplated that in various other embodiments, the cylinder block 106 may include a plurality of piston bores, similar to the piston bore 108, and each such piston bore may be configured to receive a piston similar to the piston 114. In such a configuration, the cylinder head 104, the plurality of piston bores (including the piston bore 108) and the plurality of pistons (including the piston 114) may define a plurality of combustion chambers, similar to the combustion chamber 116.

The cylinder head 104 may include a first end surface 124 and a second end surface 126. The first end surface 124, the piston bore 108 and the piston 114 define the combustion chamber 116. The second end surface 126 may define one or more valve openings 128a, 128b for receiving a valve. The valve openings 128a, 128b may be in fluid communication with an intake port 130 and an exhaust port 132, respectively, formed in the cylinder head 104 of the engine 100. Particularly, an intake valve 134 and an exhaust valve 136 may be operably disposed at least partially and respectively in the valve openings 128a, 128b. The intake valve 134 and/or the exhaust valve 136 may have a spring or an elastic element 137. The spring element 137 may be configured to bias the associated intake valve 134/exhaust valve 136 to a closed position. In various other embodiments, the spring element 137 may be any other type of biasing mechanism that can be used to bias the intake valve 134/exhaust valve 136 to their closed positions.

Figure 2:
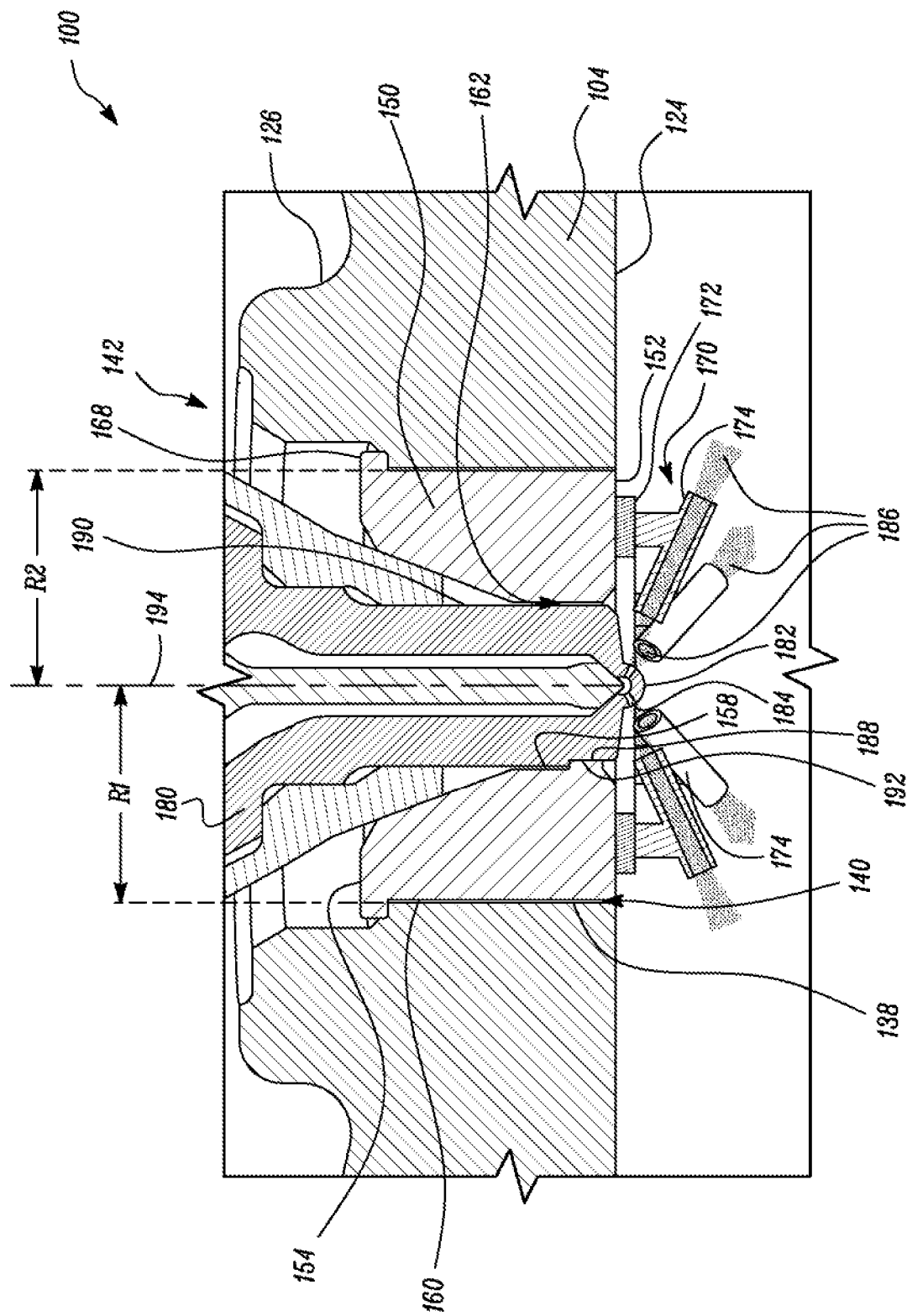
FIG. 2 illustrates a sectional view of a portion of the engine having a fuel injector assembly, in accordance with an embodiment of the present disclosure.
Figure 3:
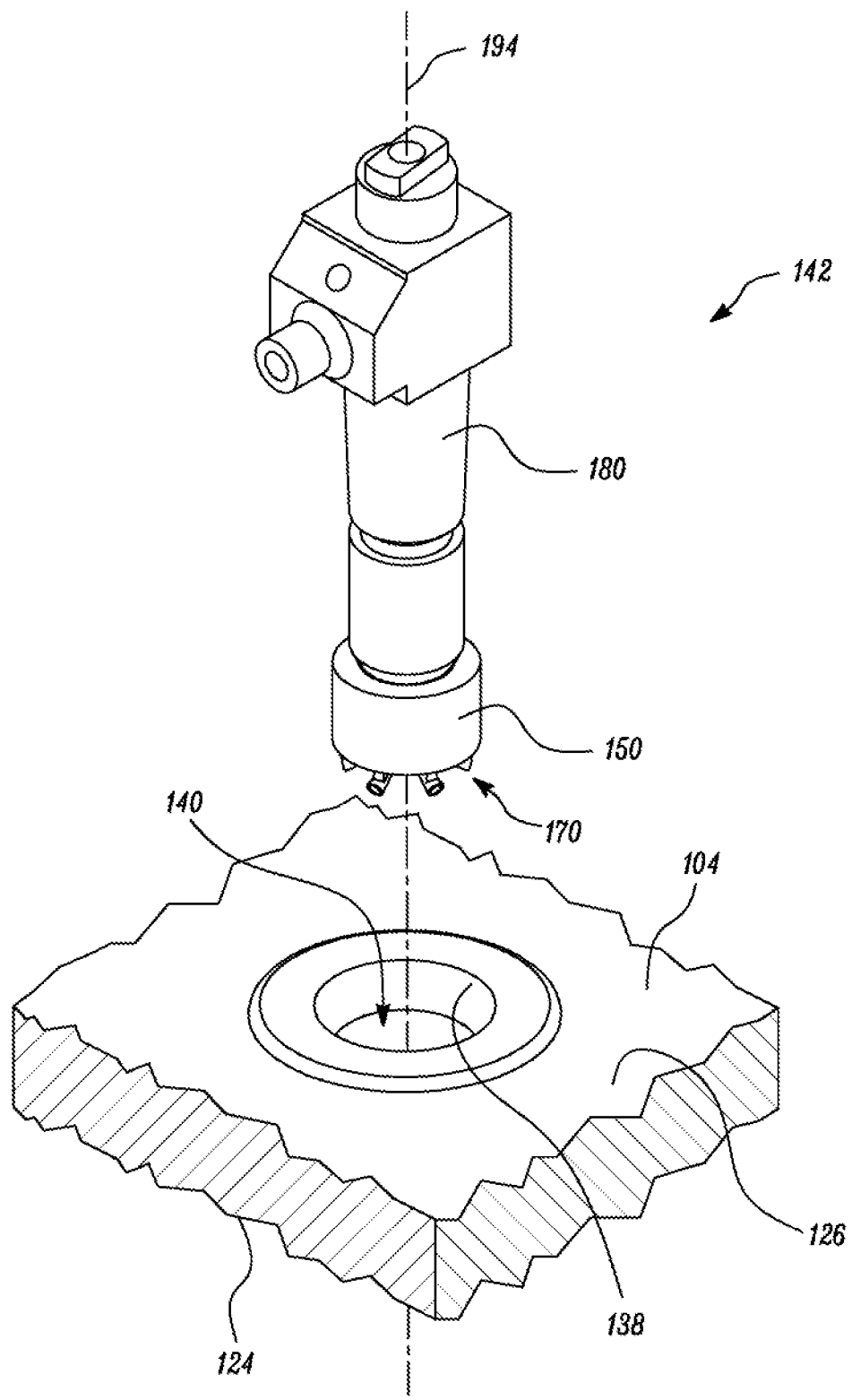
FIG. 3 illustrates an exploded view of a portion of the engine, depicting one or more components of the fuel injector assembly, in accordance with an embodiment of the present disclosure.

Referring to FIG. 2 and FIG. 3, the cylinder head 104 includes an inner cylinder surface 138 that defines a through-hole 140 extending from the first end surface 124 to the second end surface 126 of the cylinder head 104. The through-hole 140 is configured to receive one or more engine components, as will be understood from the description below.

Referring now to FIG. 1, FIG. 2, FIG. 3, and FIG. 4, the engine 100 includes a fuel injector assembly 142. The fuel injector assembly 142 is received within the through-hole 140 present in the cylinder head 104. The fuel injector assembly 142 includes an insert 150, a duct structure 170, and a fuel injector 180.

The insert 150 is received within the through-hole 140 and is coupled to the cylinder head 104 of the engine 100. The insert 150 includes a first end 152 and a second end 154. The insert 150 further includes an inner surface 158 and an outer surface 160. In the embodiment illustrated in FIG. 3, the insert 150 is a metallic structure (having a cavity) that has a shape similar to that of the through-hole 140. For example, the through-hole 140 is illustrated as a hollow cylindrical cavity and the insert 150 is illustrated as an elongated member having a cylindrical cross-section.

In an embodiment, as illustrated in FIG. 2, the insert 150 may be coupled to the cylinder head 104 by press fitting the insert 150 into the through-hole 140 of the cylinder head 104. In such a configuration, the insert 150 may be sized such that a cross-section of the insert 150 is larger than a cross-section of the through-hole 140 present in the cylinder head 104. For example, the through-hole 140 defined by the cylinder head 104 may include a radius 'R1' (the radius 'R1' being constant from the first end surface 124 to the second end surface 126). The insert 150, at an outer periphery of the insert 150, may have a radius 'R2' ('R2' being greater than 'R1'). R2 may be constant throughout a length (i.e. a length of the insert 150 extending between the first end 152 and the second end 154) of the insert 150.

In an alternate embodiment, as illustrated in FIGS. 8A-8D, the insert 150 and the through-hole 140 may take a frusto-conical shape (i.e. having a tapered outer surface). Assuming that the through-hole 140 and the insert 150 have a height 'H' ('H' being equivalent to the distance between the first end surface 124 and the second end surface 126). The through-hole 140 and the insert 150 may be sized such that the insert 150 has a slightly greater radius than the radius of the through-hole 140 along the entire height 'H'.

Figure 5:
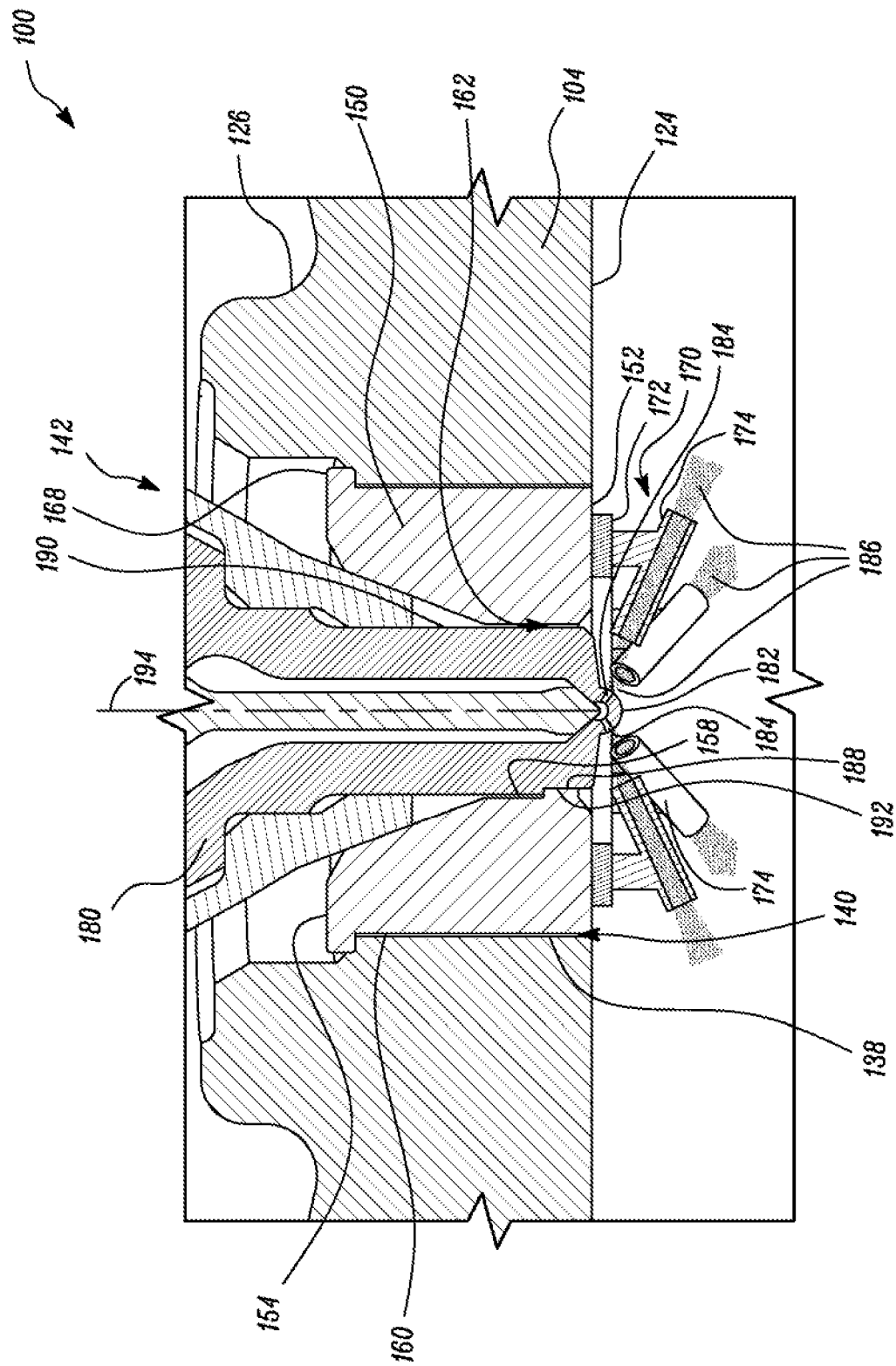
FIG. 5 illustrates the sectional view of the portion of the engine having the fuel injector assembly, in accordance with another embodiment of the present disclosure.

In an embodiment, the second end 154 of the insert 150 may include a flanged region 168, as illustrated in FIG. 5. The flanged region 168 may be defined as a portion of the insert 150 at the second end 154 having a cross-section significantly larger than the cross section of the through-hole 140. The flanged region 168 may be configured to abut the cylinder head 104 and prevent an axial movement of the insert 150 in a direction towards the combustion chamber 116.

Figure 4:
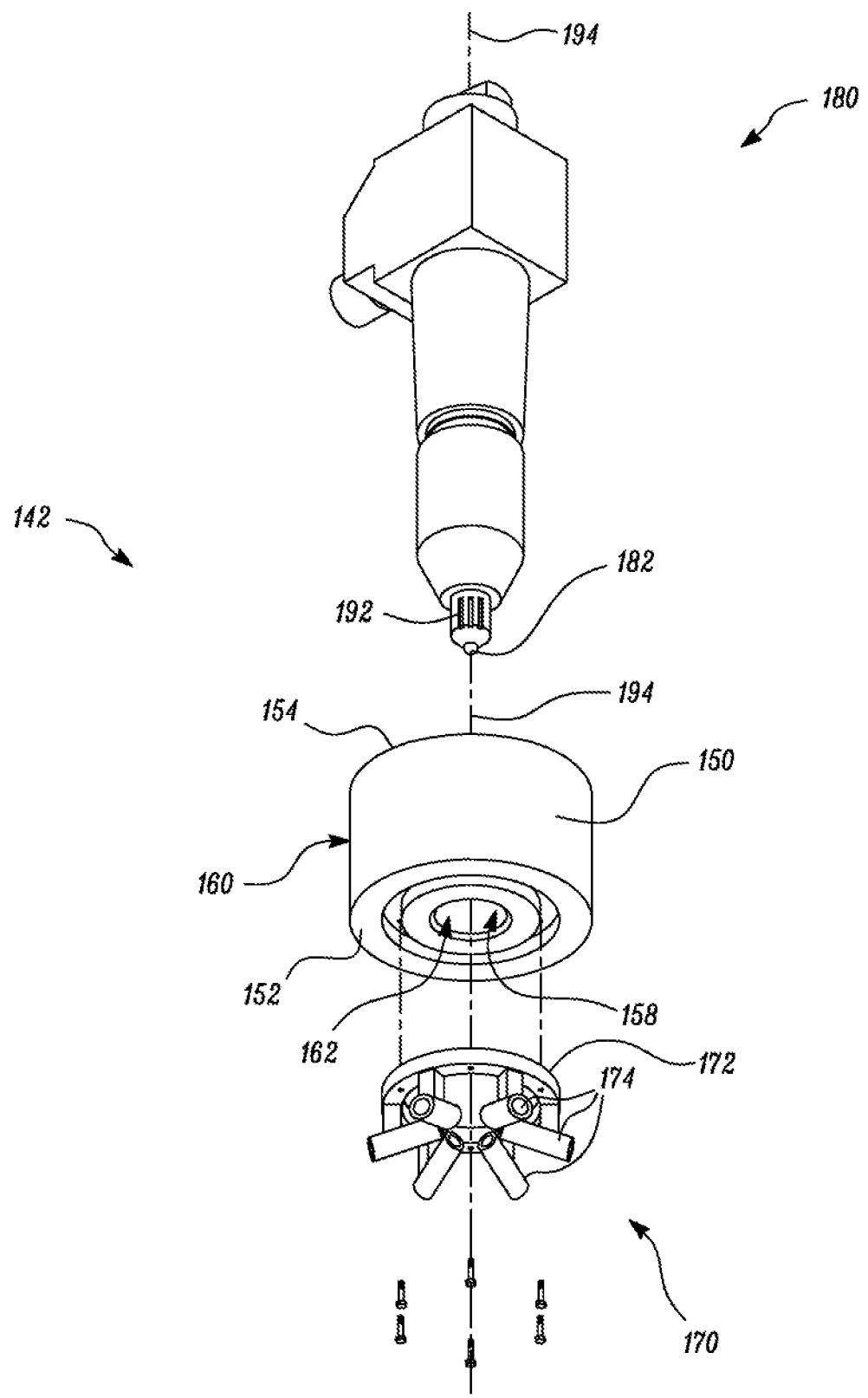
FIG. 4 illustrates an exploded view of the fuel injector assembly, in accordance with an embodiment of the present disclosure.

The embodiment, illustrated in FIG. 3 and FIG. 4 when viewed in conjunction with FIG. 2, demonstrates an assembly of the fuel injector assembly 142 such that the insert 150 is placed in the through-hole 140 of the cylinder head 104 along a vertically downward direction (i.e. vertically downward along an axis 194 or in a direction from the second end surface 126 to the first end surface 124). However, in alternate embodiments as illustrated in FIGS. 7A-7D (illustrating the insert 150 as a cylindrical structure) and FIGS. 8A-8D (illustrating the insert 150 as a frusto-conical structure), the insert 150 may be received and press-fitted within the through-hole 140 of the cylinder head 104 from below the cylinder head 104 (i.e. in a vertically upward direction along the axis 194 or in a direction from the first end surface 124 or the piston adjacent surface of the cylinder head 104 towards the second end surface 126).

Figure 10:
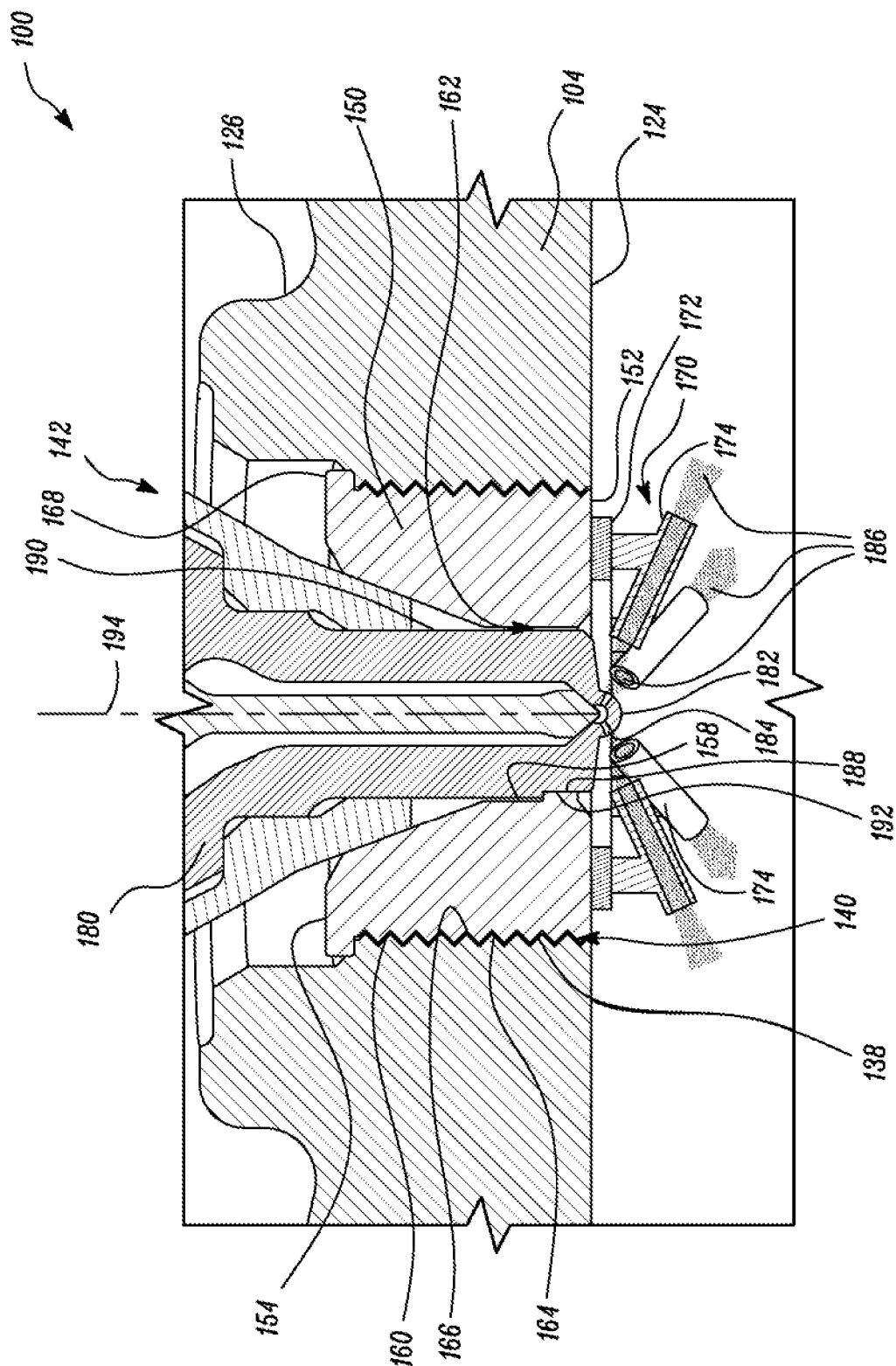
FIG. 10 illustrates the sectional view of the portion of the engine having the fuel injector assembly, in accordance with another embodiment of the present disclosure.

In the embodiments illustrated in FIG. 2, FIG. 3, FIG. 5, FIG. 6, FIGS. 7A-7D and FIGS. 8A-8D, the insert 150 is press fitted into the cylinder head 104 to couple the insert 150 with the cylinder head 104. However, in various other embodiments alternate ways may be used to couple the insert 150 with the cylinder head 104. For example, the insert 150 may be threadably coupled to the cylinder head 104, as illustrated in FIG. 10. For example, the insert 150 may have an insert thread 164 provided on the outer surface 160 of the insert 150. The inner cylinder surface 138 may include threads as well, referred to as hole thread 166. The hole thread 166 has a profile that is complementary to the insert thread 164. In such a configuration, the insert thread 164 may be engaged with the hole thread 166 to rotatably couple the insert 150 with the cylinder head 104. In the embodiment illustrated in FIG. 10, the second end 154 of the insert 150 may include the flanged region 168. The flanged region 168 may be configured to abut the cylinder head 104 when the insert 150 is received and threadably coupled with the cylinder head 104. Thereby, preventing axial movement of the insert 150 in the direction towards the combustion chamber 116 (as shown in FIG. 1).

Referring to FIG. 2, FIG. 5, FIG. 7A and FIG. 8A the fuel injector assembly 142 has the duct structure 170 coupled to the first end 152 of the insert 150 such that a portion of the duct structure 170 extends into the combustion chamber 116 of the engine 100 (best illustrated in FIG. 1, FIG. 2 and FIG. 5). The duct structure 170 may be coupled to the first end 152 of the insert 150 before the insert 150 is received within the through-hole 140. Alternatively, the duct structure 170 may be coupled to the first end 152 of the insert 150 after the insert has been received and coupled with the cylinder head 104.

Figure 9:
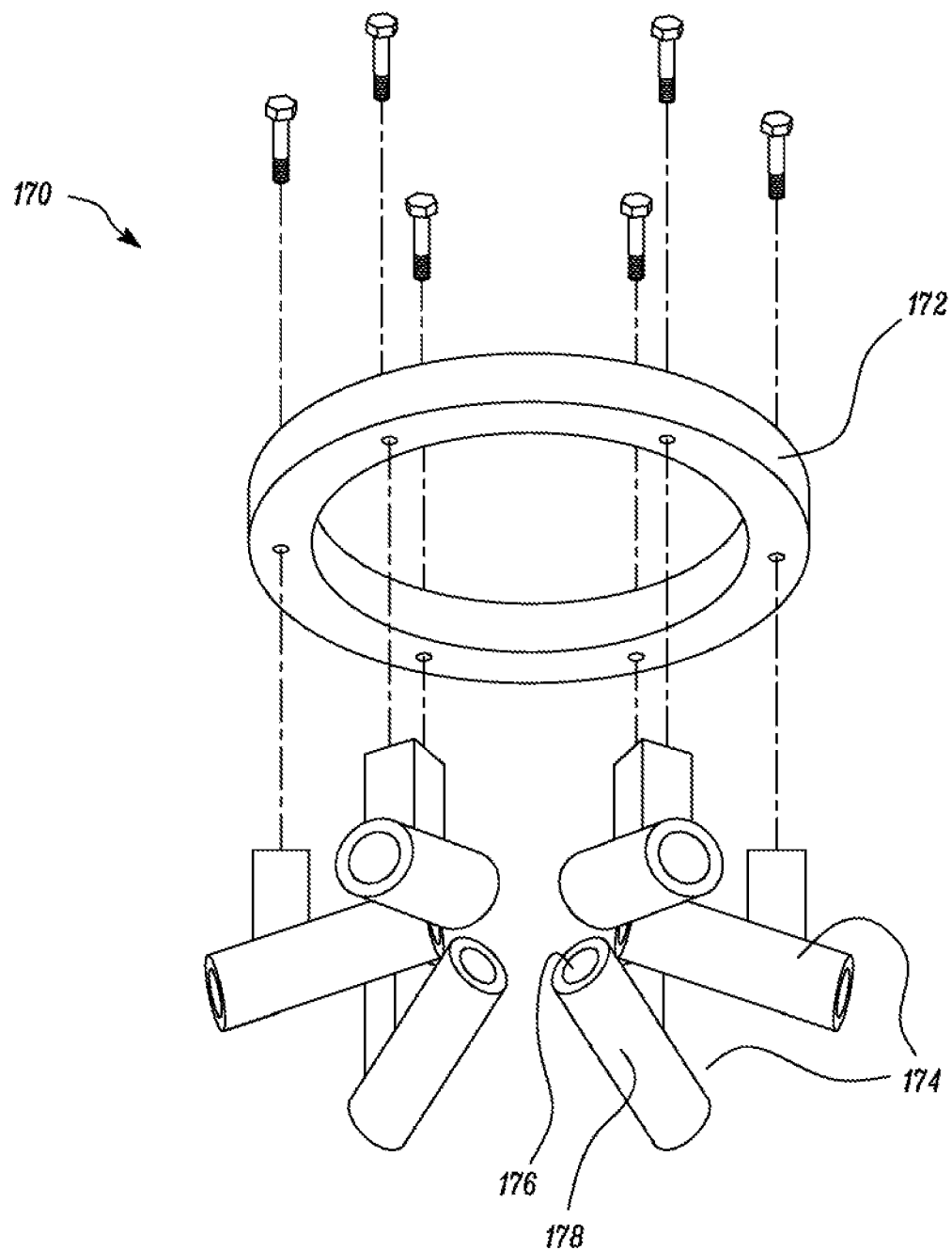
FIG. 9 illustrates a duct structure of the fuel injector assembly, in accordance with an embodiment of the present disclosure.

The duct structure 170 includes a base structure 172 and a plurality of ducts 174, as illustrated in FIG. 9. The base structure 172 may be a solid structure configured to be coupled to the first end 152 of the insert 150. For example, the base structure 172 may be a ring, as illustrated in FIG. 9. The plurality of ducts 174 may be coupled to the base structure 172 via the use of fastener devices such as bolts. In various other embodiments, the plurality of ducts 174 may be coupled to the base structure 172 via brazing, welding, or other methods. In an embodiment, the base structure 172 and the plurality of ducts 174 may be an integrated structure (requiring no coupling with each other) fabricated via 3D-printing, additive manufacturing, casting, etc.

Each duct of the plurality of ducts 174 may be a tubular structure. Each duct of the plurality of ducts 174 may include an inner duct wall 176 and an outer duct wall 178. In an embodiment, the tubular structure of each duct 174 may correspond to a hollow cylindrical structure. In an alternate embodiment, the tubular structure of each duct 174 may be a hollow frusto-conical structure. In various other embodiments, the tubular structure of each duct 174 may correspond to a hollow elongated structure having a polygonal cross section.

Referring again to FIG. 2, FIG. 4, FIG. 5, FIG. 6, FIGS. 7A-7D and FIGS. 8A-8D, the inner surface 158 of the insert 150 defines a bore 162 extending from the first end 152 of the insert 150 to the second end 154 of the insert 150. The bore 162 receives the fuel injector 180. The fuel injector 180 is configured to supply one or more fuel charges (i.e. fuel jets) into the combustion chamber 116. The fuel injector 180 includes a tip 182. The tip 182 may extend into the combustion chamber 116 and may be in fluid communication with the combustion chamber 116. The tip 182 includes a plurality of orifices 184 configured to inject one or more fuel jets 186 into the combustion chamber 116.

The fuel injector 180 is received within the bore 162 and is coupled to the insert 150 such that the plurality of ducts 174 align with the plurality of orifices 184 of the fuel injector 180. The alignment of the plurality of ducts 174 relative to the fuel injector 180 configures the plurality of ducts 174 to at least partially receive one or more fuel jets 186 from the plurality of orifices 184 of the fuel injector 180.

The plurality of orifices 184 (present on the tip 182 of the fuel injector 180) may be configured to directly inject a sequence of at least one fuel charges into the combustion chamber 116 and/or the plurality of ducts 174 during a combustion cycle (the combustion cycle is a cycle wherein fuel is introduced into the combustion chamber 116 to prepare an intake charge). The combustion cycle may be any cycle such as a two-stroke cycle (spark ignited/compression ignited), a four-stroke cycle (spark ignited/compression ignited), a dual fuel cycle, a five-stroke cycle, a six-stroke cycle, Miller cycle, Atkinson cycle or any other cycle).

In an embodiment, the fuel injector 180 may be axially and rotationally aligned relative to the duct structure 170 according to a configuration shown in FIG. 2, FIG. 4 and FIG. 5. In such a configuration as illustrated in FIG. 2, FIG. 4 and FIG. 5, the insert 150 may have a protuberance 188 provided on the inner surface 158 (best illustrated in FIG. 2 and FIG. 5). The protuberance 188 may be a projection having any shape. For example, in the embodiment illustrated the protuberance 188 is a cuboidal projection present on the inner surface 158.

The fuel injector 180 may include an outer injector surface 190 having a grooved region 192 (best illustrated in FIG. 4). The protuberance 188 may be configured to engage the grooved region 192 to align the fuel injector 180 relative to the plurality of ducts along an axial direction (i.e. along longitudinal axis 194 of the insert 150/fuel injector 180). In an embodiment, the insert 150 may include a plurality of protuberances 188 circumferentially spaced apart on the inner surface 158 of the insert 150. The fuel injector 180 may also have a plurality of grooved regions 192 (illustrated in FIG. 4) on the outer injector surface 190 to abut and mate with the plurality of protuberances 188. In an embodiment, the duct structure 170 and the fuel injector 180 may be coupled to the insert 150 (and aligned via the use of the protuberance 188 and the grooved region 192) such that each duct 174 is inclined relative to the longitudinal axis 194 of the fuel injector 180 to align the plurality of orifices 184 relative to the plurality of ducts 174.

For example, the plurality of ducts 174 may be connected/coupled to the base structure 172 such that each duct of the plurality of ducts 174 is inclined (at a specified angle) relative to the longitudinal axis 194 of the fuel injector 180/insert 150 (via use of one or more indexing structures provided on the plurality of ducts 174 and/or the base structure 172). In such a configuration, when the fuel injector 180 is placed in the bore 162 of the insert 150, the protuberance 188 in the insert 150 abuts the grooved region 192 of the fuel injector 180 such that each duct of the plurality of ducts 174 receives at least a portion of a fuel jet 186 from the fuel injector 180.

Figure 6:
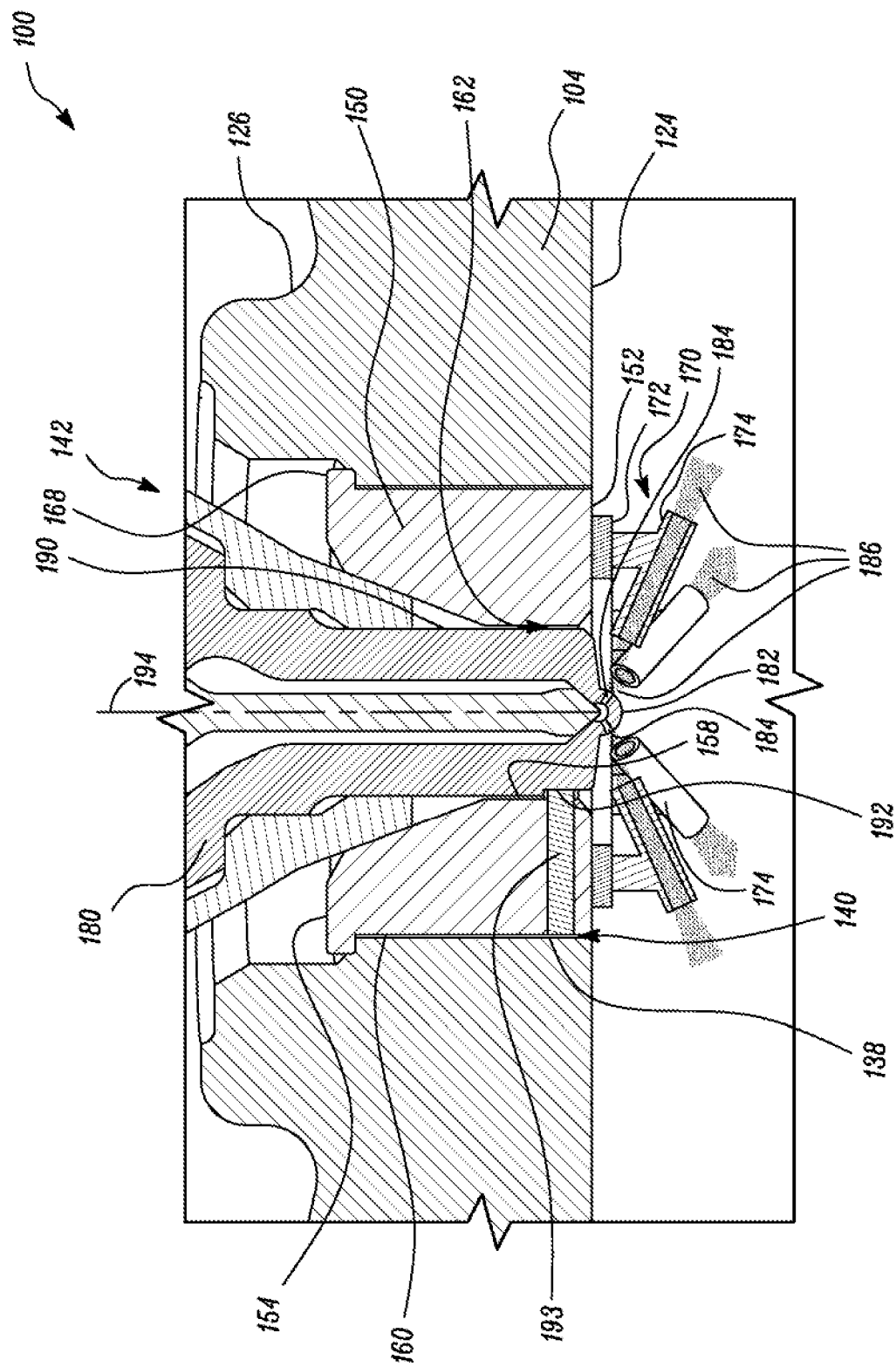
FIG. 6 illustrates the sectional view of the portion of the engine having the fuel injector assembly, in accordance with another embodiment of the present disclosure.

In the embodiment illustrated in FIG. 5 the grooved region 192 of the fuel injector 180 abuts the protuberance 188 of the insert 150 to rotationally align the fuel injector 180 relative to the duct structure 170. However, in an alternate embodiment, as illustrated in FIG. 6, a pin 193 may be used instead of the protuberance 188. For example, a hole/through-hole may be drilled within the insert 150 proximal to the first end 152. The pin 193 may be inserted in the drilled hole/through-hole such that pin 193 extends into the bore 162 of the insert 150. In such a configuration when the fuel injector 180 is placed in the bore 162 of the insert 150, the pin 193 present in the insert 150 abuts the grooved region 192 of the fuel injector 180 such that each duct of the plurality of ducts 174 is configured to receive at least a portion of a fuel jet 186 from the fuel injector 180. Thereby, rotationally aligning the fuel injector 180 relative to the duct structure 170.

The alignment of the plurality of orifices 184 relative to the plurality of ducts 174 positions the plurality of orifices 184 of the fuel injector 180 relative to the plurality of ducts 174 such that fuel charge 186 (i.e. fuel jets) injected by the plurality of orifices 184, at least partially, pass through each duct of the plurality of ducts 174. Each duct of the plurality of ducts 174 may be configured to interact with the fuel charge injected by the fuel injector 180 and alter the entrainment and combustion characteristics. For example, the fuel jets 186 injected by the fuel injector 180 may interact with the inner duct walls 176 of the plurality of ducts 174 such that the fuel jets 186 attach to the inner duct wall 176 and widen relative to the original width of the fuel jets 186 (i.e. the width of the fuel jets 186 prior to entering the plurality of ducts 174). This widening of the fuel jets 186 may promote mixing of air and fuel within the combustion chamber 116.

Figure 12:
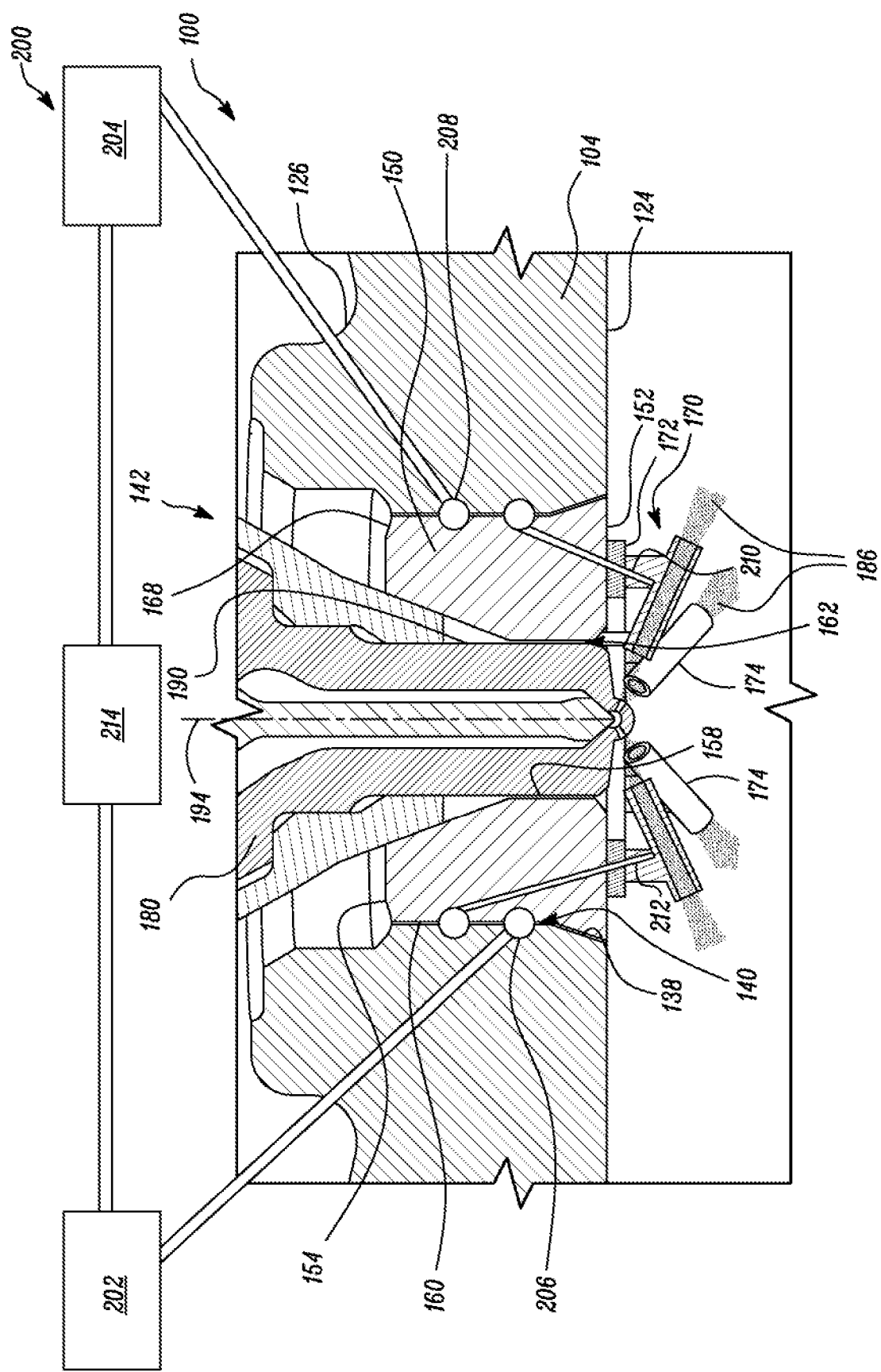
FIG. 12 illustrates the sectional view of the portion of the engine along plane 1-1' of FIG. 11D, in accordance with an embodiment of the present disclosure.
Figure 13:
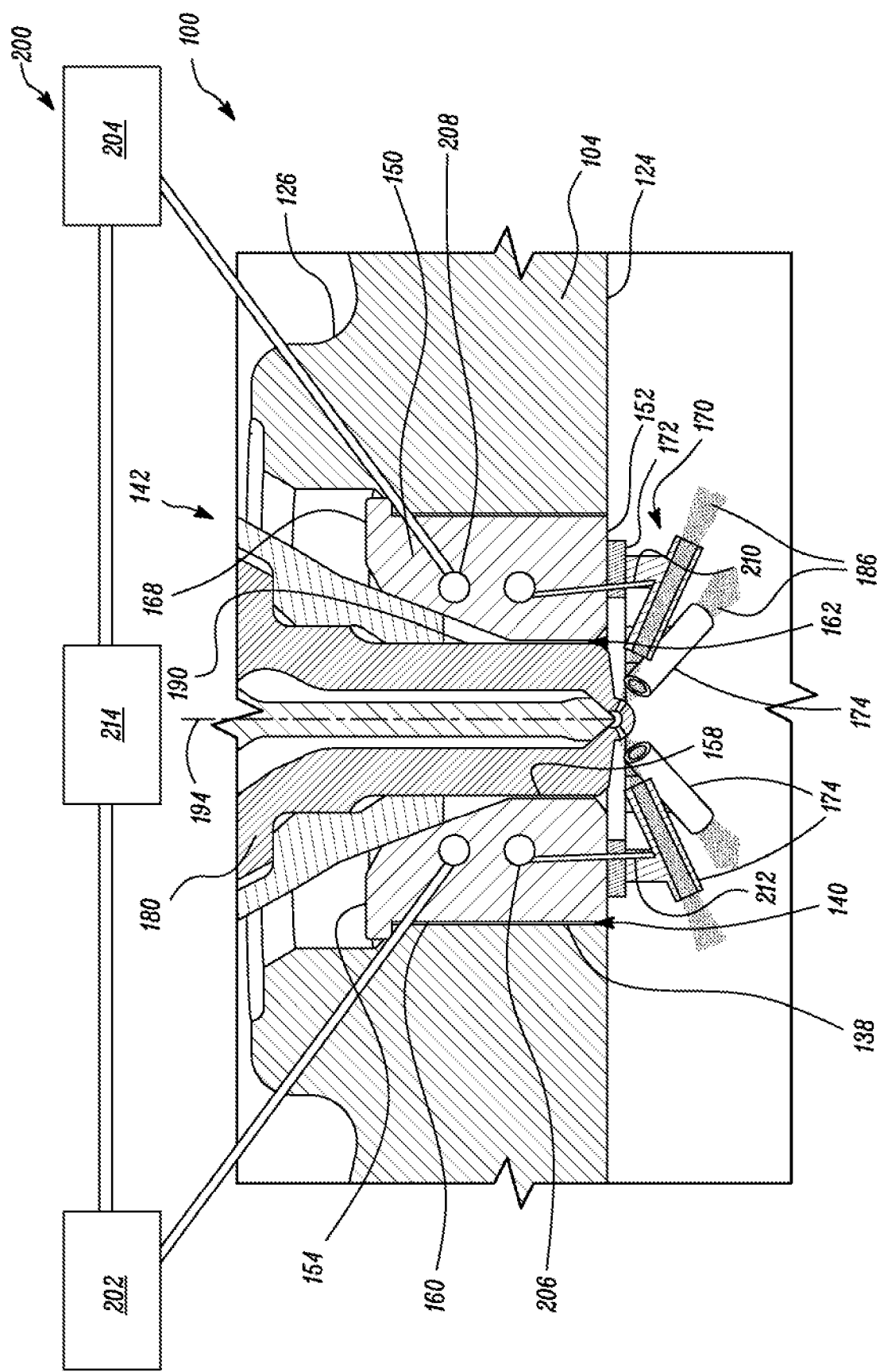
FIG. 13 illustrates the sectional view of the portion of the engine having the cooling system, in accordance with another embodiment of the present disclosure.

In certain implementations, as illustrated in FIG. 12 and FIG. 13, the fuel injector assembly 142 may also include a cooling system 200 configured to control a temperature of each duct of the plurality of ducts 174. The cooling system 200 may include a first reservoir 202, a second reservoir 204, a first annular passage 206, a second annular passage 208, a first duct passage 210, a second duct passage 212 and a heat exchanger 214. The first reservoir 202 may have a coolant fluid stored therein. The coolant fluid may correspond to water, air, refrigerants, inert gases etc.

In the embodiment illustrated in FIG. 12, the first annular passage 206 may be present within the insert 150. The first annular passage 206 may be fluidly coupled to the first reservoir 202 to receive the coolant fluid from the first reservoir 202. The first duct passage 210 may be defined/present within the duct structure 170 and may be coupled to the first annular passage 206. The first duct passage 210 may be configured to receive coolant from the first annular passage 206 and may circulate the coolant fluid to each of the plurality of ducts 174. The coolant fluid present within the first duct passage 210 may interact with the plurality of ducts 174 to absorb heat from each duct. The absorption of heat by the coolant fluid may lead to elevation in the temperature of the coolant fluid.

The second duct passage 212 may be defined by the duct structure 170. The second duct passage 212 may be fluidly coupled with the first duct passage 210 such that the second duct passage 212 may facilitate exit of heated coolant fluid from the duct structure 170. The second annular passage 208, defined by the insert 150 may be fluidly coupled to the second duct passage 212 to receive the heated coolant fluid from the second duct passage 212. The second annular passage 208 may be fluidly coupled to the second reservoir 204 to transfer the heated coolant fluid from the second annular passage 208 to the second reservoir 204. The heat exchanger 214 may be disposed between the first reservoir 202 and the second reservoir 204. The heat exchanger 214 may be configured to receive the coolant at high temperature from the second reservoir 204 and reduce the temperature within a predetermined range. Subsequent to the reduction in temperature, the coolant may then be circulated to the first reservoir 202.

In an embodiment, the first duct passage 210 and the second duct passage 212 may be formed by implementing a drilling operation in the insert 150 and the duct structure 170.

In an embodiment, the insert 150 may undergo a turning operation to form a groove 220 extending circumferentially along the outer surface 160 of the insert 150, as illustrated in FIG. 11A. A similarly sized circumferential groove 224 may be formed on the inner cylinder surface 138 of the cylinder head 104, as shown in FIG. 11C. When the insert 150 is received and press-fitted within the through-hole 140 of the cylinder head 104, the circumferential grooves 220 and 224 present on the insert 150 and the cylinder head 104 are aligned adjacent to each other and form the second annular passage 208, as illustrated in FIG. 12 (depicting the sectional view of the engine along 1-1' of FIG. 11D).

Similarly, the insert 150 may undergo a second turning operation to form another groove 222 extending circumferentially along the outer surface 160 of the insert 150, as illustrated in FIG. 11B. A similarly sized circumferential groove 226 may be formed on the internal surface 138 of the cylinder head 104. When this insert 150 is received within the through-hole 140 of the cylinder head 140, the first annular passage 206 may be defined, in a manner similar to that explained for the second annular passage 208.

In an embodiment, the first annular passage 206 may be fluidly coupled to passages circulating the coolant within the cylinder head 104. In such a configuration, the cooling system 200 may circulate engine coolant to lower the temperature of the plurality of ducts 174.

INDUSTRIAL APPLICABILITY

As discussed above, ducted assemblies may be implemented in combustion engines to enhance mixing and reduce the amount of soot formed within combustion chambers of such engines. The ducted assemblies include one or more tubular structures known as ducts coupled to the cylinder head. The ducts are positioned relative to the fuel injector such that the ducts receive fuel jets from the at least one orifice of the fuel injector. The fuel jets interact with the ducts to enhance mixing, thereby reducing the amount of soot formed). The orientation of the fuel jets with respect to the ducts plays a vital role in achieving optimal operation of the ducted assemblies.

During operation of the engine, the fuel injector and/or the ducts may wear and may eventually fail. Replacing or repairing the fuel injector in such configurations may include a de-coupling of the cylinder head from the cylinder block, manually aligning the ducts relative to the orifice of new/repaired fuel injector and re-coupling the cylinder head. Similarly, replacing or repairing the ducts may include de-coupling of the cylinder head from the cylinder block, manually aligning new/repaired ducts relative to the orifice of fuel injector and re-coupling the cylinder head. Such replacement/repairing processes may include cumbersome operations that require skilled labor, which may increase the cost of operation. Further, the removal of the cylinder head and alignment of the ducts relative to the fuel injector is a laborious and a time-consuming task.

In an aspect of the present disclosure, the fuel injector assembly 142 is disclosed, as shown in FIG. 2-FIG. 13. The fuel injector assembly 142, having the insert 150, duct structure 170 and the fuel injector 180, may be received in the through-hole 140 present in the cylinder head 104. In case of a repairing/replacing process the fuel injector assembly 142 may be pulled out of the cylinder head 104 (i.e. embodiment of FIG. 2 when the insert 150 is press-fitted) or may be rotationally engaged with the cylinder head 104 to remove the fuel injector assembly 142 (i.e. embodiment of FIG. 5 i.e. threadable coupling) from the cylinder head 104. Such an assembly obviates a removal of the cylinder head 104 of the engine 100. Thereby, reducing machine down time and lowering the complexity of the repairing/replacing process. Further, the presence of the protuberance 188 and grooved region 192 on the insert 150 and the fuel injector 180 respectively, facilitates a speedy, precise rotational alignment of the fuel injector 180 relative to the duct structure 170. Such a configuration eliminates a need for using intricate tools and also prevents a need for aligning the fuel injector 180 relative to the duct structure 170 by skilled labor and/or process. Thereby reducing the cost of repairing process/replacement process.

Figures 7A, 7B:
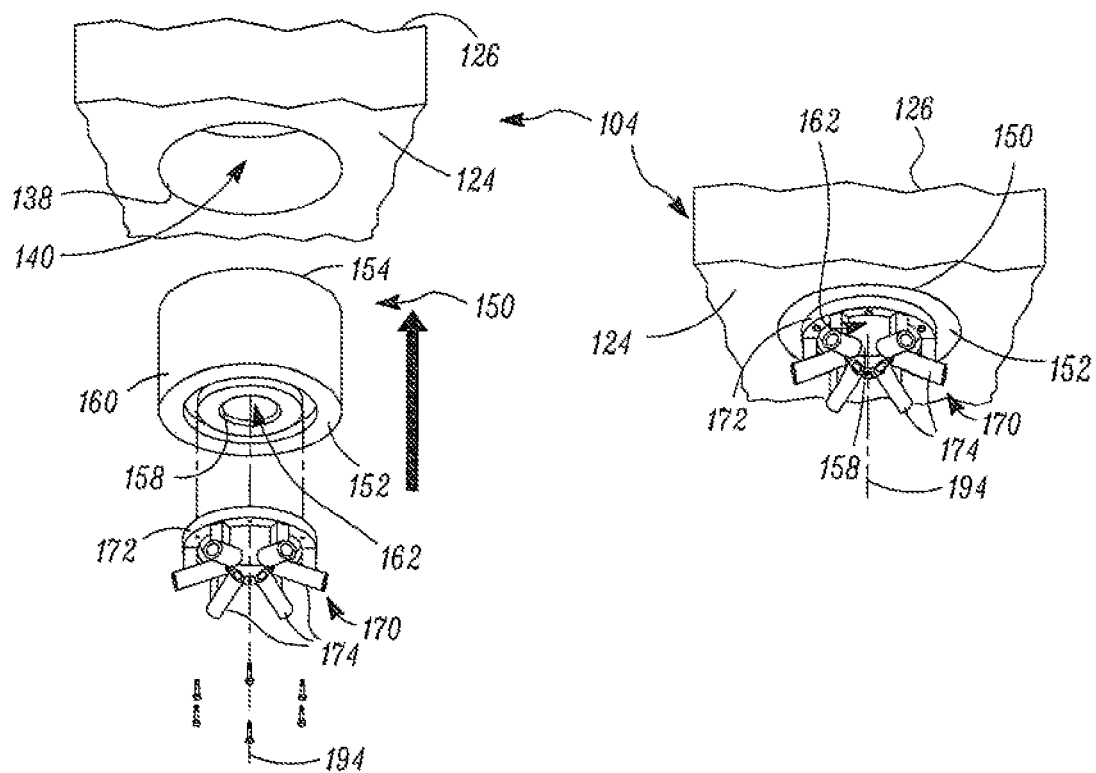
FIG. 7A illustrates a first stage of assembling the fuel injector assembly, in accordance with an embodiment of the present disclosure.
FIG. 7B illustrates a second stage of assembling the fuel injector assembly, in accordance with an embodiment of the present disclosure.
Figures 7C, 7D:
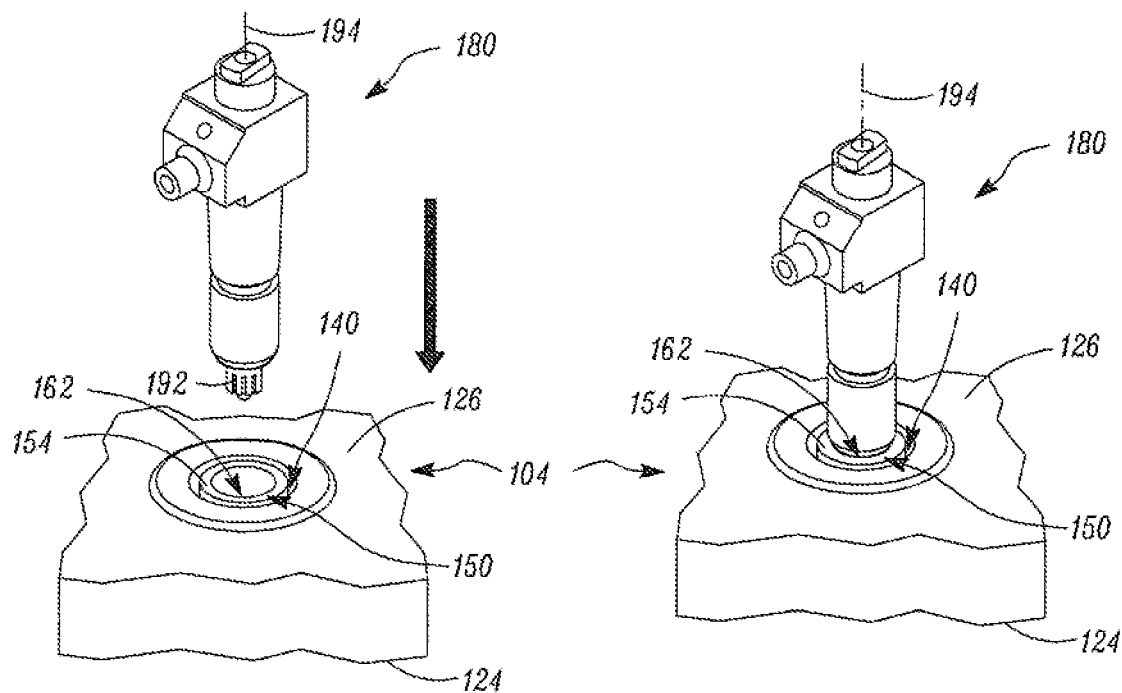
FIG. 7C illustrates a third stage of assembling the fuel injector assembly, in accordance with an embodiment of the present disclosure.
FIG. 7D illustrates a fourth stage of assembling the fuel injector assembly, in accordance with an embodiment of the present disclosure.
Figure 14:
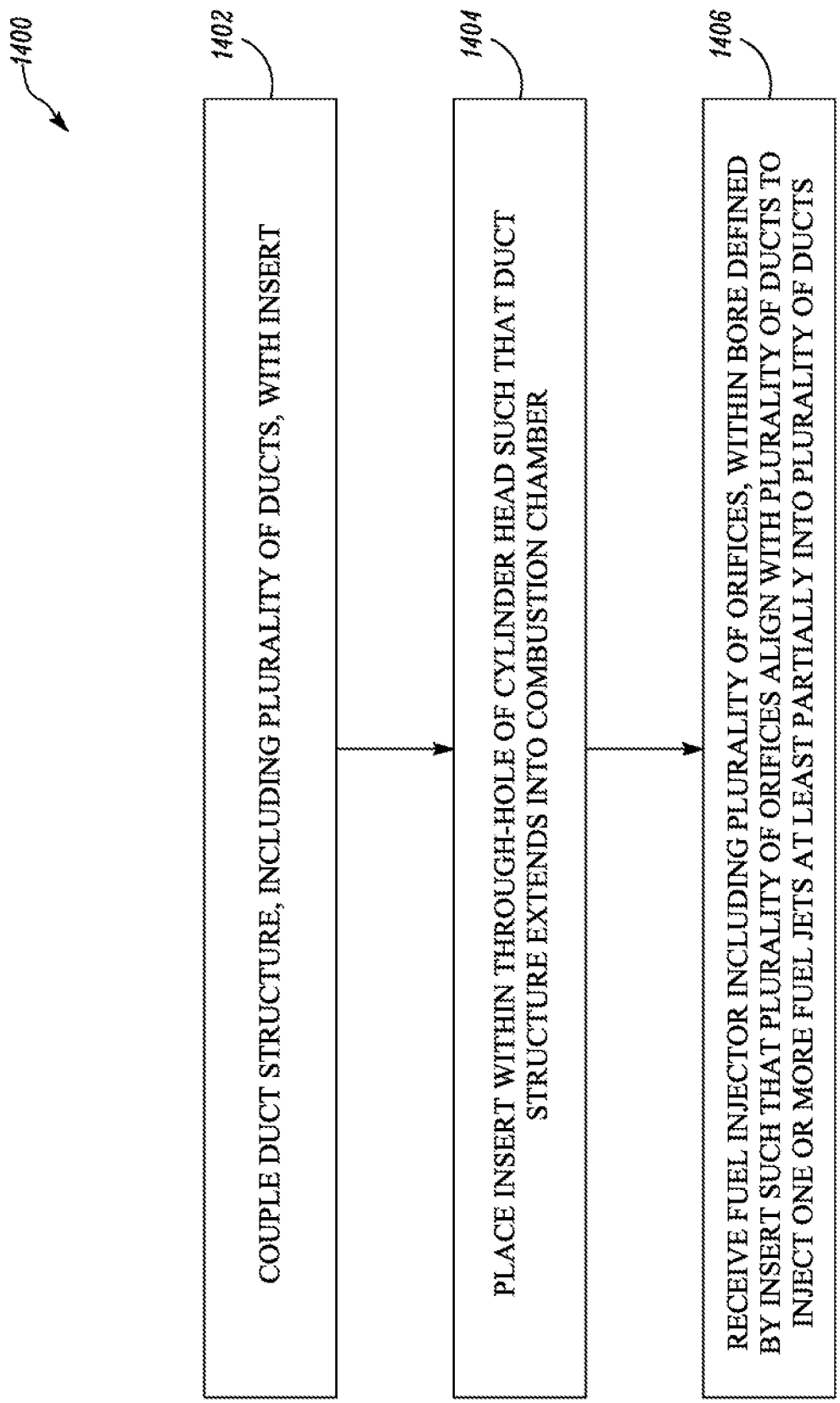
FIG. 14 depicts a method of installing the duct structure and a fuel injector in an engine, in accordance with another embodiment of the present disclosure.

In another aspect of the present disclosure, a method 1400 for installing the duct structure 170 and the fuel injector 180 in the engine 100 is disclosed (in FIG. 14). The method 1400 includes coupling the duct structure 170 having the plurality of ducts 174 with the insert 150 (Step 1402), as disclosed in FIG. 7A and FIG. 8A. The method 1400 then includes placing the insert 150 within the through-hole 140 present in the cylinder head 104 such that the duct structure 170 extends into the combustion chamber 116 (Step 1404), as illustrated in FIG. 6 and FIG. 7B. The method 1400 then includes receiving the fuel injector 180 having the plurality of orifices 184, within the bore 162 defined by the insert 150 (as illustrated in FIG. 7C and FIG. 8C) such that the plurality of orifices 184 align with the plurality of ducts 174 to inject one or more fuel jets at least partially into the plurality of ducts 174 (Step 1406), as illustrated in FIG. 2 and FIG. 5.

In an embodiment, as illustrated in FIG. 12, the insert 150 may have a dual angled structure i.e. a structure having a straight section and a diverging cross-section at the first end 152. In such a configuration of the insert 150 the straight section provides strength against the installation of the fuel injector 180 and the diverging portion provides resistance to the pressure generated within the combustion chamber 116, thereby preventing axial movement of the insert 150 in a direction away from the combustion chamber 116.

Using the fuel injector assembly 142 and the method 1400 as disclosed in the present disclosure, an operator/serviceman may easily replace damaged fuel injectors and/or ducts from the engine 100. Further, the presence of the alignment features in the fuel injector assembly 142 obviates the need for precision tools and skilled labor being used to replace the fuel injector and/or ducts and the need for careful alignment of the fuel injector 180 with the duct structure 170. The reduced time for servicing (replacing and/or repairing) may reduce the machine downtime thereby increasing productivity. Further, the time saved by the skilled labor may be invested to eliminate other bottlenecks in a typical maintenance/service process, thereby further helping to increase productivity.

Further, as discussed above, the insert 150 is a component that is inserted into the through-hole 140 of the cylinder head 104. Since the insert 150 and the cylinder head 104 are different components the insert 150 may be manufactured/fabricated by a different process (i.e. a process different from process used to fabricate the cylinder head 104) and may be of a material different from the material used for manufacturing the cylinder head 104. Thereby reducing cost (as the material used in the cylinder head 104 and the process to form the cylinder head 104 are both costly).

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A fuel injector assembly for an engine, the engine including a cylinder head defining a through-hole, the fuel injector assembly comprising:
   an insert, having a first end and a second end, configured to be received within the through-hole and coupled to the cylinder head, the insert defining a bore extending from the first end to the second end;
   a fuel injector including a plurality of orifices at a distal end portion of the fuel injector, the fuel injector being received within the bore of the insert and having a groove provided at the distal end portion; and
   a duct structure including a plurality of ducts, the duct structure being coupled to the insert such that the plurality of ducts align with the plurality of orifices to at least partially receive one or more fuel jets from the plurality of orifices of the fuel injector, a length of the groove with respect to a longitudinal axis of the fuel injector being defined such that the groove is configured to axially position the plurality of orifices of the fuel injector in alignment relative to the plurality of ducts, the duct structure being fastened to the first end of the insert, and an outer surface of the insert extends radially outward of the duct structure and is press-fit into the cylinder head.

2. The fuel injector assembly of claim 1 wherein the duct structure is coupled to the first end of the insert such that each duct of the plurality of ducts is axially spaced from the insert.

3. The fuel injector assembly of claim 1 wherein,
   the insert defines a protuberance; and
   the fuel injector includes a grooved region in which the groove is provided, the groove being configured to abut the protuberance to rotationally align the fuel injector relative to the duct structure.

4. The fuel injector assembly of claim 1 wherein the second end of the insert includes a flanged region, the flanged region configured to abut the cylinder head to restrict axial movement of the insert relative to the cylinder head.

5. The fuel injector assembly of claim 1 wherein each duct of the plurality of ducts is a tubular structure.

6. An engine comprising:
   a piston;
   a cylinder block defining a piston bore, the piston bore configured to receive the piston;
   a cylinder head coupled to the cylinder block, the cylinder head defining a through-hole;
   a combustion chamber being defined by the piston, the cylinder block and the cylinder head;
   a fuel injector assembly received within the through-hole of the cylinder head, the fuel injector assembly comprising:
      an insert, having a first end and a second end, received within the through-hole and coupled to the cylinder head, the insert defining a bore;
      a duct structure, including a plurality of ducts, coupled to the insert such that the plurality of ducts extends into the combustion chamber, the duct structure being fastened to the first end of the insert, and an outer surface of the insert extends radially outward of the duct structure and is press-fit into the cylinder head; and
      a fuel injector, including a plurality of orifices at a distal end portion of the fuel injector, the fuel injector having a groove at the distal end portion with a length defined with respect to a longitudinal axis of the fuel injector such that the groove is configured to position the plurality of orifices of the fuel injector in alignment with the plurality of ducts, the fuel injector being received within the bore such that the plurality of orifices align with the plurality of ducts to inject one or more fuel jets at least partially into the plurality of ducts, wherein the bore is defined by an inner surface of the insert that contacts the fuel injector at a proximal portion of the insert and has a diameter that increases in a direction opposite to an insertion direction of the fuel injector into the bore.

7. The engine of claim 6 wherein each duct of the plurality of ducts is a tubular structure.

8. The engine of claim 6 wherein, the insert and the duct structure is an integral structure fabricated by using one of additive manufacturing and casting.

9. The engine of claim 6 wherein,
   the insert and the cylinder head define a first annular passage configured to carry a coolant fluid therein;
   the duct structure defines:
      a first passage fluidly coupled to the first annular passage, the first passage is configured to circulate the coolant fluid to each of the plurality of ducts, the coolant fluid configured to absorb heat from each duct; and
      a second passage facilitating exit of the heated coolant fluid from the duct structure; and
   the insert and the cylinder head define a second annular passage configured to receive the heated coolant fluid from the second passage.

10. The engine of claim 6 wherein the first end of the insert is fastened to the duct structure such that each duct of the plurality of ducts is axially spaced from the first end of the insert.

11. The engine of claim 10 wherein the second end of the insert includes a flanged region abutting the cylinder head.

12. The engine of claim 6 wherein the duct structure is coupled to the insert such that each duct is inclined relative to the longitudinal axis of the fuel injector to align the plurality of ducts with the plurality of orifices of the fuel injector.

13. The engine of claim 6 wherein,
   the insert includes a protuberance; and
   the fuel injector includes a grooved region in which the groove is provided, the groove being configured to abut the protuberance to rotationally align the fuel injector relative to the duct structure.

14. A method for installing a duct structure and a fuel injector in an engine, the engine comprising a cylinder block, a cylinder head and a piston defining a combustion chamber, the method comprising:
   coupling the duct structure, including a plurality of ducts, with an insert;
   placing the insert within a through-hole of the cylinder head such that the duct structure extends into the combustion chamber;
   receiving the fuel injector, including a plurality of orifices and a groove at a distal end portion of the fuel injector, within a bore defined by the insert that has a diameter that increases in a direction opposite to an insertion direction of the fuel injector, axially aligning the plurality of orifices with the plurality of ducts with the groove in the distal end portion of the fuel injector; and rotationally aligning the plurality of orifices with the plurality of ducts with the groove provided in the distal end portion of the fuel injector to inject one or more fuel jets at least partially into the plurality of ducts.

15. The method of claim 14 further including coupling the insert with the cylinder head by one of press-fitting the insert into the through-hole or threadably coupling the insert with the cylinder head.

16. The method of claim 14 wherein the duct structure is coupled to a first end of the insert such that each duct of the plurality of ducts is axially spaced from the insert.

17. The method of claim 14 wherein coupling the duct structure with the insert includes using one of bolts, a brazing process, or a welding process.

18. The fuel injector assembly of claim 1 wherein the bore is defined by an inner surface of the insert that contacts the fuel injector at a proximal portion of the insert and has a diameter that increases in a direction opposite to an insertion direction of the fuel injector into the bore.

19. The fuel injector assembly of claim 1 wherein the groove is provided partially between the first end and the second end of the insert.

20. The fuel injector assembly of claim 1 wherein the distal portion of the fuel injector includes a first circumferential side that includes the groove, and a second circumferential side opposite the first circumferential side that is formed without a groove.

* * * * *